Patented Dec. 22, 1953

2,663,704

UNITED STATES PATENT OFFICE 2,663,704

PROCESS AND COMPOSITION FOR PRODUCING IMPROVED VISCOSE

George C. Yehling, Jr., St. Louis, Mo., assignor to American Viscose Corporation, Wilmington, Del., a corporation of Delaware No Drawing. Application April 19, 1950, Serial No. 156,924

8 Claims. (Cl. 260—217)

This invention relates to the production of viscose. More particularly the invention relates to certain improvements in carrying out one or more steps in the production of viscose from chemically prepared wood pulp and the like.

In the known and currently practiced procedure for the manufacture of viscose from cellulose or wood pulp, the same is first subjected to a steeping operation. The purpose of steeping is to provide the fibers with a certain amount of caustic soda which is necessary in the subsequent mercerizing and xanthating steps and to disolve out certain impurities from the pulp, such as hemicellulose. The steeping is accomplished by soaking the wood pulp in sodium hydroxide of 15 to 20% concentration for a predetermined period of time and at constant temperature. The steeped pulp is then pressed to remove the excess caustic soda which carries away the impurities dissolved therein. The pressed product is known as alkali cellulose and is pressed to a ratio of approximately 3 parts of alkali cellulose to 1 part of original dry cellulose.

The alkali cellulose is broken up or shredded and then aged or oxidized at constant temperature and humidity to a predetermined degree of polymerization depending upon what use the final product is to be put. The aged alkali cellulose is then reacted with carbon disulfide to produce a sodium cellulose xanthate which in turn is dissolved in dilute caustic soda to produce the viscose solution.

The viscose must be aged and filtered before use. Aging is necessary to attain the right viscosity for spinning artificial fibers or films for example. It is important that the viscose be filtered in order to remove the unreacted cellulose fibers and gel particles contained therein which will clog up the fine holes in a spinneret or the narrow slit through which a film is cast.

Due to the unreacted cellulose fibers and gels present in the viscose, filtering of the same becomes a tedious and costly procedure. The gels and fibers rapidly clog the filter and a large quantity of filter media must be used which necessitates increased labor to prepare and change such media. Consequently reduction of the gels and fibers in the viscose becomes desirable and commercially important.

It is an object of the present invention to overcome the aforementioned difficulties and provide an improved viscose having improved filterability.

Other objects and advantages of the present invention will be apparent and obvious from the description hereinafter.

While the invention is described with particular reference to its applicability to the production of viscose, it should be understood that this is merely intended to be illustrative and not limitative since the invention is equally applicable to the production of other cellulose or cellulose derivative solutions which are made from alkali cellulose, such as the cellulose ether solutions, namely, hydroxy alkyl, carboxy alkyl cellulose ethers, and the like.

The objects of the present invention are accomplished by adding to the steeping liquor, an organic sequestering agent, such as a polyamino carboxylic acid salt, in combination with a wetting agent. It has been found that these agents greatly enhance the filterability of the viscose, i. e., the same is filtered more easily and quickly and with greater efficiency. The sequestering and wetting agents must be stable in caustic soda concentration of 15% or stronger at temperatures ranging from 10 to 50° C. in order to produce an improved alkali cellulose from which can be produced an improved viscose solution, cellulose ether solution, and the like.

The filterability of a viscose solution or colloidal dispersion is greatly dependent on the number of gels or gel particles contained therein in addition to the number of unreacted cellulose fibers which may be present. In fact, the experimentally determined filterability is considered the most significant measure of microscopic discontinuities in the viscose, and is a function of the gel and fiber counts, i. e., the amount of each in the viscose. The filter life, i. e., the time that a filter medium may be used without changing, decreases as the numerical value of the filterability increases. In other words, as the filterability approaches zero, the viscose approaches perfection as far as microscopic discontinuities are concerned. Thus in order to reduce the filterability the gel and fiber content of the viscose must be reduced.

It is believed that di- and tri-valent metallic ions, such as iron, calcium, magnesium, etc., present in the wood pulp and steeping liquor (NaOH) in minute amounts, have enormous effects on gel formation in the viscose. These ions, and particularly the calcium ions, act as gelation centers around which gels form. Their removal is believed to contribute to reduced gel formation in the viscose.

It has been proposed to use common inorganic sequestering agents such as "Calgon" (sodium hexametaphosphate) to remove the di- and trivalent ions which act as gelation centers by adding the same to the steeping liquor. These have proved unsatisfactory since they are unstable in high caustic soda concentrations. Precipitating agents will not remove the undesirable ions completely or to a desirable minimum and further they add other undesirable elements to the steeping liquor.

It has been found that organic sequestering agents of the polyamino carboxylic acid salt type produce a viscose solution having improved filterability when from 0.01 to 0.1% based on the weight of the steeping liquor, of the agent is added to the steeping liquor in combination with a wetting agent. The effect of the sequestering agent is increased when employed in combination with a wetting agent such as an alkali metal salt of a higher aliphatic alcohol sulfate. The concentration of the wetting agent may vary between 0.001% and 0.1% based on the weight of the steeping liquor.

The organic sequestering agent is believed to form a chelated compound with the di- and trivalent metallic ions which is soluble in caustic soda but non-ionizable. The unwanted metallic ions are effectively prevented from acting as gelation centers for the formation of gels when the alkali cellulose has been further processed, reacted on by $CS_2$, and put in solution to form viscose. The action of the wetting agent appears to be synergetic or co-operative probably allowing or aiding the sequestering agent to penetrate the pulp thus reaching any unwanted metallic ions trapped therein.

Compounds having the following general formula are suitable as sequestering agents in the present invention—

$$(XOOCR)_2N-(CH_2)_y-N-(RCOOX)_2$$

where

R is an alkylene group of 1 to 3 carbon atoms,
X is a hydrogen or an alkali metal, and
Y is an integer from 1 to 10.

As an example of such a sequestering agent there may be named the sodium salt of ethylene diamine tetra-acetic acid. This compound has proved to be extremely satisfactory when employed in combination with a wetting agent of the class mentioned hereinbefore. As an example of a suitable wetting agent to be used in conjunction with the above sequestering agents may be named "Tergitol 08"

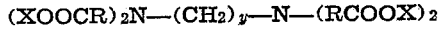

which is a sodium salt of beta-ethyl hexanol sulfate.

The following examples are representative.

EXAMPLE I

Wood pulp was steeped in 18% NaOH at 23° C. and processed in the usual manner. The viscose solution produced from the xanthated alkali cellulose was used as a control. Wood pulp was also steeped in 18% NaOH at 23° C. which also contained 0.05% Tergitol 08 and 0.01% of the sodium salt of ethylene diamine tetra acetic acid based on the weight of the steeping liquor. The steeped wood pulp was processed in the usual manner and a viscose solution produced. The two viscose solutions were allowed to age for 24 hours under the same conditions, namely, 24 hours at 16.5° C. At the end of this time, samples were taken and gel and fiber counts made of both batches of viscose with the following results:

Table I.—Gel and fiber count on viscose

|  | Control [1] | A [2] |
|---|---|---|
|  | No agents added to steeping liquor | Agents added to Steeping liquor |
| Gels/cc. ($n \times 10^{-6}$) | 8.3 | 4.7 |
| Large Fibers/cc | 74 | 64 |
| Small Fibers/cc | 188 | 102 |
| Total Fibers/cc | 262 | 166 |

[1] Average of 4 tests.
[2] Average of 5 tests.

From the above table it can be seen that the number of gels in the viscose solution is decreased by approximately 45% when the pulp is steeped in NaOH containing .05% Tergitol 08 and 0.01% of the sodium salt of ethylene diamine tetra acetic acid. The number of unreacted cellulose fibers is also greatly decreased.

EXAMPLE II

The procedure of Example I was followed in two additional runs using 0.00125% Tergitol "08" and 0.01% in one and 0.02% in the other of the sodium salt of ethylene diamine tetra acetic acid in the steep liquor. Experimental results were obtained which are tabulated below.

Table II

| Sequestering Agent | Control | 0.01% | 0.02% |
| Wetting Agent | (No Agents) | 0.00125% | 0.00125% |
|---|---|---|---|
| Filterability | 4.6 | 3.3 | 2.5 |
| Large Fibers/cc | 22 | 21 | 6 |
| Small Fibers/cc | 211 | 144 | 128 |
| Total Fibers/cc | 233 | 165 | 134 |

The filterability in the table is represented by comparative empirical values which decrease as filterability improves, the ideal being represented by a value of zero.

From these results it can be seen that the addition of a sequestering agent and wetting agent to the steep liquor decreases the empirical value of the filterability of the resulting viscose thereby improving the same.

The use of the wetting agent alone does not decrease the gels in the viscose. Use of the sequestering agent alone shows a little decrease in the number of gels but not enough to be advantageous. When both are used in combination, however, there is a remarkable decrease in the number of gels as well as unreacted cellulose fibers, in the viscose solution with a resultant decrease in the filterability.

The viscose produced according to the present invention may be formed into filaments and films with less danger of clogging the openings by the gels which in turn reduces the cost of manufacture. The viscose is more easily and readily filtered requiring less time since a smaller number of filter media changes are required and further, at a reduced cost.

I claim:

1. A process for producing improved alkali cellulose which comprises steeping cellulose in 15 to 20% aqueous sodium hydroxide containing from about 0.01 to 0.1% of the sodium salt of ethylene diamine tetra acetic acid and from about 0.001 to 0.1% of the sodium salt of beta ethyl hexanol sulfate based on the weight of the steeping liquor.

2. A process for producing improved alkali cellulose which comprises steeping cellulose in 18% aqueous sodium hydroxide at 23° C. containing 0.01% of the sodium salt of ethylene diamine tetra acetic acid and 0.05% of the sodium salt of beta ethyl hexanol sulfate based on the weight of the steeping liquor.

3. A process for producing improved alkali cellulose which comprises steeping cellulose in 15 to 20% aqueous sodium hydroxide containing from about 0.01 to 0.1% of the sodium salt of ethylene diamine tetra acetic acid and from about 0.001 to 0.1% of an alkali metal salt of a higher aliphatic alcohol sulfate based on the weight of the steeping liquor.

4. A process for producing improved viscose which comprises forming alkali cellulose by steeping cellulose in 15 to 20% aqueous sodium hydroxide containing from about 0.01 to 0.1% of the sodium salt of ethylene diamine tetra acetic acid and from about 0.001 to 0.1% of the sodium salt of beta ethyl hexanol sulfate based on the weight of the steeping liquor, and then reacting the alkali cellulose with $CS_2$ to produce sodium cellulose xanthate and then dissolving the xanthate to produce viscose.

5. A process for producing improved viscose which comprises forming alkali cellulose by steeping cellulose in 18% aqueous sodium hydroxide at 23° C. containing 0.01% of the sodium salt of ethylene diamine tetra acetic acid and 0.05% of the sodium salt of beta ethyl hexanol sulfate based on the weight of the steeping liquor and then reacting the alkali cellulose with $CS_2$ to produce sodium cellulose xanthate and then dissolving the xanthate to produce viscose.

6. A composition for steeping cellulose in the manufacture of alkali cellulose comprising an 18% aqueous sodium hydroxide solution containing 0.01% of the sodium salt of ethylene diamine tetra acetic acid and 0.05% of the sodium salt of beta ethyl hexanol sulfate.

7. A composition for steeping cellulose in the manufacture of alkali cellulose comprising a 15 to 20% aqueous sodium hydroxide solution containing from about 0.01 to 0.1% of the sodium salt of ethylene diamine tetra-acetic acid and from about 0.001 to 0.01% of the sodium salt of beta ethyl hexanol sulfate based on the weight of the steeping liquor.

8. A composition for steeping cellulose in the manufacture of alkali cellulose comprising a 15 to 20% aqueous sodium hydroxide solution containing from about 0.01 to 0.1% of the sodium salt of ethylene diamine tetra-acetic acid and from about 0.001 to 0.01% of the alkali metal salt of a higher aliphatic alcohol sulfate based on the weight of the steeping liquor.

GEORGE C. YEHLING, Jr.

References Cited in the file of this patent

UNITED STATES PATENTS

| Number | Name | Date |
|---|---|---|
| 2,081,528 | Brodersen | May 25, 1937 |
| 2,114,605 | Nicoll | Apr. 19, 1938 |
| 2,157,294 | Lier | May 9, 1939 |
| 2,240,957 | Munz | May 6, 1941 |
| 2,412,943 | Bersworth | Dec. 24, 1946 |
| 2,412,945 | Bersworth | Dec. 24, 1946 |
| 2,432,129 | Schlosser | Dec. 9, 1947 |
| 2,502,330 | Libby | Mar. 28, 1950 |
| 2,542,385 | Ayo et al. | Feb. 20, 1951 |

FOREIGN PATENTS

| Number | Country | Date |
|---|---|---|
| 461,747 | Great Britain | Feb. 23, 1937 |

OTHER REFERENCES

Hatch et al., Journal of Ind. & Eng. Chem., January 1939, page 52.